(12) United States Patent
Hall

(10) Patent No.: US 12,273,129 B2
(45) Date of Patent: Apr. 8, 2025

(54) RANDOMLY JITTERED UNDER-SAMPLING AND PHASE SAMPLING FOR TIME-FREQUENCY AND FREQUENCY ANALYSES IN AFCI, GFCI, METERING, AND LOAD RECOGNITION AND DISAGGREGATION APPLICATIONS

(71) Applicant: Schneider Electric USA, Inc., Andover, MA (US)

(72) Inventor: Joseph Hall, Rapid City, IA (US)

(73) Assignee: Schneider Electric USA, Inc., Boston, MA (US)

( * ) Notice: Subject to any disclaimer, the term of this patent is extended or adjusted under 35 U.S.C. 154(b) by 168 days.

(21) Appl. No.: 17/959,251

(22) Filed: Oct. 3, 2022

(65) Prior Publication Data

US 2023/0104134 A1   Apr. 6, 2023

Related U.S. Application Data

(60) Provisional application No. 63/251,369, filed on Oct. 1, 2021.

(51) Int. Cl.
  *H03M 1/12*   (2006.01)
  *H03M 3/00*   (2006.01)
  *H04L 9/08*   (2006.01)

(52) U.S. Cl.
  CPC ........... *H03M 3/498* (2013.01); *H03M 1/127* (2013.01); *H03M 1/128* (2013.01); *H04L 9/0869* (2013.01)

(58) Field of Classification Search
  CPC ...... H03M 3/498; H03M 1/127; H03M 1/128; H04L 9/0869
  USPC .................................. 341/118, 120, 155, 122
  See application file for complete search history.

(56) References Cited

U.S. PATENT DOCUMENTS

| | | | |
|---|---|---|---|
| 2008/0204949 A1* | 8/2008 | Zhou | H02H 1/0015 361/42 |
| 2012/0105050 A1 | 5/2012 | Naffziger et al. | |
| 2014/0207979 A1* | 7/2014 | Wu | G06F 13/28 710/22 |

OTHER PUBLICATIONS

Search Report and Written Opinion for International Application No. PCT/US2022/045583 dated Feb. 2, 2023.
Search Report and Written Opinion for International Application No. PCT/US2022/045586 dated Feb. 2, 2023.

(Continued)

*Primary Examiner* — Peguy Jean Pierre
(74) *Attorney, Agent, or Firm* — Troutman Pepper Locke LLP

(57) ABSTRACT

Methods/systems employ randomly jittered under-sampling to reduce a sampling rate required to estimate the amplitude of high-frequency signals in circuit breakers, power meters, and other digital signal processing applications. The methods/systems can greatly reduce the nominal sampling rate for applications where RMS, peak and mean estimates of the signal are desired for both the entire band-limited signal and separate estimates for each frequency component. This can in turn result in large cost savings, as less complex and thus less expensive controllers and related components may be used to perform the sampling. As well, the methods/systems herein can provide reasonably accurate waveform estimates that allow additional cost savings in bill of materials (BOM) and printed circuit board assembly (PCBA) footprint and real-estate by eliminating the need for certain analog components, such as signal conditioning components.

22 Claims, 9 Drawing Sheets

(56) References Cited

OTHER PUBLICATIONS

Lou et al., Jittered random sampling with a successive approximation ADC, May 2014.
Hennenfent et al., Simply Denoise: Wavefield reconstruction via jittered undersampling, May 2008.
Laska et al., Random Sampling for Analog-to-Information Conversion of Wideband Signals, Oct. 1, 2006.

* cited by examiner

RANDOMLY JITTERED UNDER-SAMPLING AND PHASE SAMPLING FOR TIME-FREQUENCY AND FREQUENCY ANALYSES IN AFCI, GFCI, METERING, AND LOAD RECOGNITION AND DISAGGREGATION APPLICATIONS

CROSS-REFERENCE TO RELATED APPLICATIONS

This application for patent claims the benefit of priority to and incorporates herein by reference U.S. Provisional Application No. 63/251,369, entitled "Randomly Jittered Undersampling Techniques for Metering, GFCI and AFCI applications," filed Oct. 1, 2021. This application is also related in subject matter to and incorporates herein by reference commonly-assigned application Ser. No. 17/959,235, entitled "Randomly Jittered Under-Sampling for Efficient Data Acquisition and Analysis in Digital Metering, GFCI, AFCI, and Digital Signal Processing Applications," filed concurrently herewith, and commonly-assigned application Ser. No. 17/959,248, entitled "Digital Signal Processing of Randomly Jittered Under-Sampled Sequence," filed concurrently herewith.

TECHNICAL FIELD

The present disclosure relates to electronic circuit breakers, digital metering devices, and other devices that employ digital signal processing, and more particularly to methods and systems for performing randomly jittered under-sampling of signals in such devices to provide efficient data acquisition and analysis.

BACKGROUND

Modern electronic circuit breakers, power meters, and other digital devices have a microcontroller and other components that enable a number of functions not previously available in older devices. For example, a microcontroller in an electronic circuit breaker allows it to function as both a ground fault circuit interrupt (GFCI) device as well as an arc fault circuit interrupt (AFCI) device. The GFCI function can detect conductive paths formed between an ungrounded current carrying conductor and earth ground, while the AFCI function can detect intermittent faults caused by worn or damaged insulation, loose connections, broken conductors, and the like. The microcontroller detects these faults by constantly sampling line current and/or voltage and monitoring the samples.

The current/voltage sampling rate in modern circuit breakers is impacted by many constraints, including CPU utilization, power consumption, as well as limited parity space to prevent collision of RAM check with DMA transfer of samples, among other constraints. These constraints can limit the maximum sampling rate achieved by the microcontroller to less than a preferred rate. Conventional practice in digital signal processing is to use a periodic sampling rate that is at least 10 times higher than the highest frequency component of the signal being sampled in order to provide a sufficiently accurate representation of the shape of the signal. At the low end, the periodic sampling rate should not fall below the well-known Nyquist rate, which is two times higher than the highest frequency component of the signal being sampled, in order to avoid errors from aliasing.

Maintaining a periodic sampling rate that is 10 times higher than the highest frequency component of the signal being sampled has become more difficult as modern circuit breakers continue to push toward increasingly higher sampling rates due to safety and efficacy concerns. For example, upcoming changes to UL943 potentially include a requirement for high-frequency ground fault detection for earth-leakage signals with frequencies up to 50 kHz ($f_c$=50 kHz). Implementing this requirement would require a periodic sampling rate of up to 500 kHz ($f_{sa}$=10×$f_c$=500 kHz) to ensure a reasonably accurate estimation of the amplitude of the signal. However, a periodic sampling rate of 500 kHz and associated ground fault detection algorithm could consume much of the microcontroller capacity and a corresponding amount of power.

Accordingly, a need exists for a way to reduce the sampling rate required to estimate the amplitude of high-frequency signals in circuit breakers, power meters, and other digital signal processing applications.

SUMMARY

Embodiments of the present disclosure provide systems and methods for reducing the sampling rate required to estimate the amplitude of high-frequency signals in circuit breakers, power meters, and other digital signal processing applications. The systems and methods employ randomly jittered under-sampling techniques in such devices and similar applications to provide efficient data acquisition and analysis. Such an arrangement can greatly reduce the nominal or average sampling rate for applications where RMS, peak and mean estimates of the signal are desired for both the entire band-limited signal and separate estimates for each frequency component. This can in turn result in large cost savings, as less complex and thus less expensive controllers and related components may be used to perform the sampling. As well, the methods and systems herein can provide reasonably accurate waveform estimates that allow additional cost savings in bill of materials (BOM) and printed circuit board assembly (PCBA) footprint and real-estate by eliminating the need for certain analog components, such as signal conditioning components (although anti-aliasing filters may still be needed).

In general, in one aspect, embodiments of the present disclosure relate to a system for analyzing a current or voltage signal. The system comprises, among other things, a controller, an analog-to-digital converter (ADC) coupled to the controller, and a sense circuit coupled to the ADC and configured to provide the current or voltage signal to the ADC from an AC mains. The system further comprises a randomly jittered sampling module coupled to the ADC and operable to provide a trigger input to the ADC, the trigger input causing the ADC to acquire a sample of the current or voltage signal provided by the sense circuit. In some embodiments, the randomly jittered sampling module is further operable to cause the ADC to acquire an aperiodic sequence of samples of the current or voltage signal, the aperiodic sequence of samples having an amount of aperiodicity that is randomly generated, and the controller is operable to perform signal processing on the aperiodic sequence of samples to extract information from the signal and provide the information to an external system.

In general, in another aspect, embodiments of the present disclosure relate to a method of analyzing a current or voltage signal. The method comprises, among other things, providing, at a sense circuit, a current or voltage signal from an AC mains to an analog-to-digital converter (ADC). The method also comprises providing, at a randomly jittered sampling module coupled to the ADC, a trigger input to the ADC, the trigger input causing the ADC to acquire a sample of the current or voltage signal provided by the sense circuit. The method further comprises changing, at the randomly jittered sampling module, a timing of the trigger input to cause the ADC to acquire an aperiodic sequence of samples of the current or voltage signal, the aperiodic sequence of samples having an amount of aperiodicity that is randomly generated. The method still further comprises performing, at a controller coupled to the ADC, signal processing on the aperiodic sequence of samples to extract information from the signal and providing the information to an external system.

In general, in still another aspect, embodiments of the present disclosure relate to a non-transitory computer-readable medium storing computer-readable instructions thereon. The computer-readable instructions, when executed by a controller, cause the controller to perform a process that receives a current or voltage signal from an AC mains at an analog-to-digital converter (ADC), and perform a process that provides a trigger input to the ADC, the trigger input causing the ADC to acquire a sample of the current or voltage signal provided by the sense circuit. The computer-readable instructions, when executed by a controller, further cause the controller to perform a process that changes a timing of the trigger input to cause the ADC to acquire an aperiodic sequence of samples of the current or voltage signal, the aperiodic sequence of samples having an amount of aperiodicity that is randomly generated, and in perform a process that performs signal processing on the aperiodic sequence of samples to extract information from the signal and provides the information to an external system.

DETAILED DESCRIPTION

This description and the accompanying drawings illustrate exemplary embodiments of the present disclosure and should not be taken as limiting, with the claims defining the scope of the present disclosure, including equivalents. Various mechanical, compositional, structural, electrical, and operational changes may be made without departing from the scope of this description and the claims, including equivalents. In some instances, well-known structures and techniques have not been shown or described in detail so as not to obscure the disclosure. Further, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Figure 1:
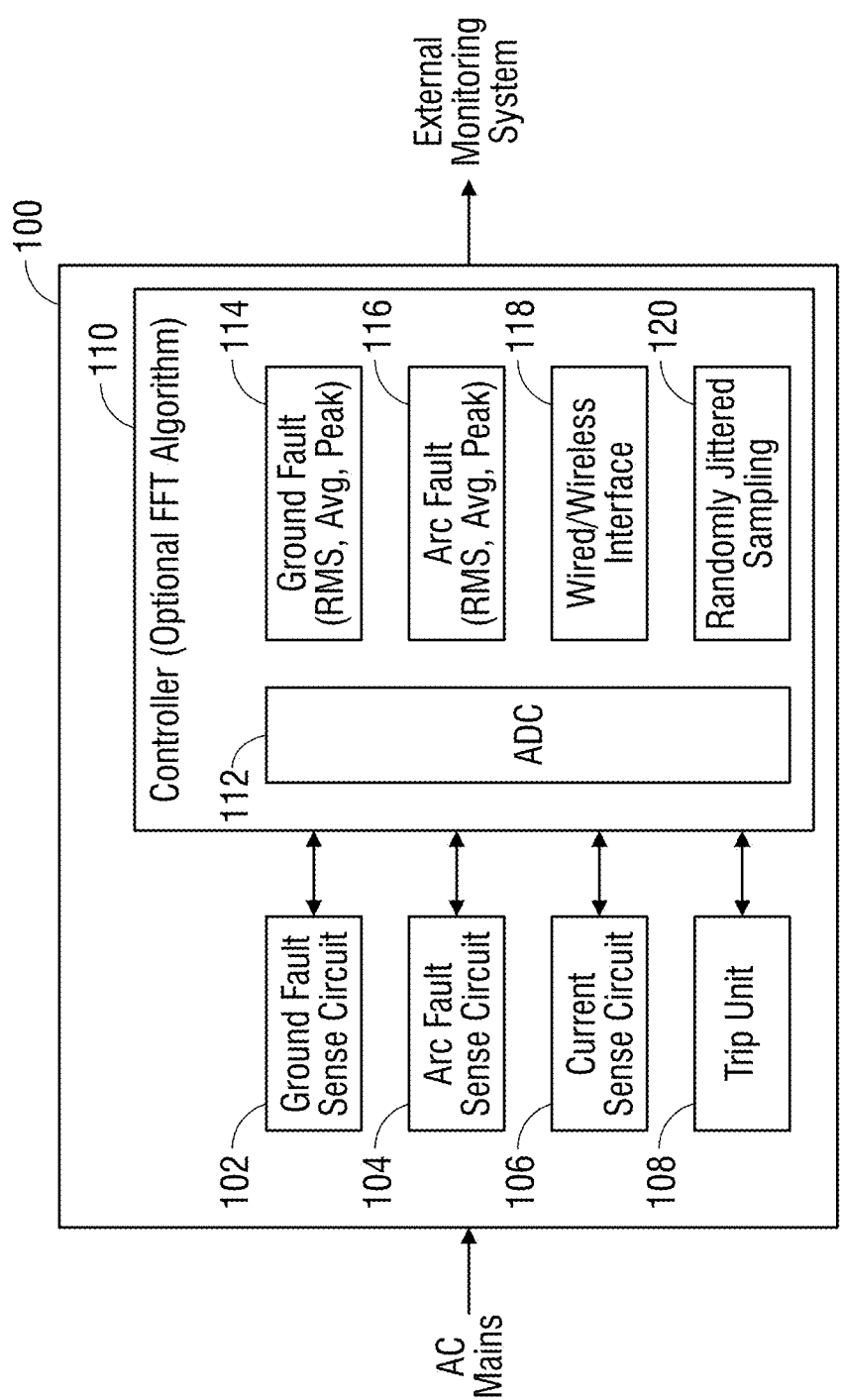
FIG. 1 is a block diagram illustrating an exemplary circuit breaker that can perform randomly jittered under-sampling according to embodiments of the present disclosure.

Referring now to FIG. 1, a block diagram is shown for an exemplary electronic circuit breaker 100 according to one or more embodiments of the present disclosure. The breaker 100 is designed to provide high-frequency ground fault detection for earth-leakage signals consistent with UL943 and similar standards without exceeding certain restrictive power consumption and CPU utilization constraints. To this end, the breaker 100 includes a number of functional components or modules, some of which are represented here as blocks, that allow the breaker 100 to perform randomly jittered under-sampling, as described later herein. It will be understood, of course, that each block shown here (and in subsequent figures) may be divided into several constituent blocks, or two or more blocks may be combined into a single block, within the scope of the present disclosure. Similarly, each block may be implemented via software (e.g., programming), hardware (e.g., ASIC), or a combination of both, within the scope of the present disclosure.

As can be seen, the breaker 100 includes a ground fault sense circuit 102, an arc fault sense signal 104, a current sense circuit 106, and a trip unit 108, in communication with a controller 110. The controller 110 itself includes at least one analog-to-digital converter (ADC) 112, a ground fault detection module 114, an arc fault detection module 116, and a wire and/or wireless interface module 118. It is also possible for the ADC 112 to be a separate component from the controller 110 in some embodiments and, in either case, may have an 8-bit, 12-bit, 16-bit, or other suitable resolution. Other functional components and modules not expressly shown may also be included within the scope of the present disclosure. Likewise, one or more of the expressly shown functional components and modules may be removed without departing from the disclosure.

Operation of the breaker 100 is generally well known in the art and therefore only a brief description is provided herein. In general, the controller 110 receives analog signals from the ground fault sense circuit 102, arc fault sense circuit 104, current sense circuit 106, and other circuits that can sense AC mains current and voltage. These analog signals, which may include current signals and voltage signals, are sampled by the ADC 112 at a certain sampling rate that is sufficiently high for load recognition and disaggregation and waveform amplitude detection. The ADC 112 converts each sample into a numerical value that is proportional to an amplitude of the sample and outputs these values as a time data sequence. The data sequence is then processed in a known manner by the controller 110 to detect occurrence of ground faults, arc faults, short-circuits, and so forth. Upon detecting a fault condition, the controller 110 issues a trip signal to the trip unit 108 that causes the trip unit to immediately shut off current flow through the breaker 100.

Examples of suitable controllers that may be used as the controller 110 include the PIC series of microcontrollers from Microchip Technology, Inc., an ARM (Advanced RISC Machine) based microcontroller, as well as a digital signal processor (DSP), an ASIC, and the like. In preferred embodiments, any controller may be used as the controller 110 as long as that controller can execute a fast Fourier transform algorithm for the signal samples obtained by the ADC 112. A fast Fourier transform (FFT) algorithm, as understood by those skilled in the art, computes a discrete Fourier transform (DFT) for a time sequence of sample values to obtain the frequency components thereof.

In accordance with one or more embodiments, a randomly jittered sampling module 120 may be provided in the controller 110 for controlling the sampling that the ADC 112 performs for one or more of the signals for which high-frequency sampling is required. As alluded to above, the rate at which the ADC 112 performs sampling can be limited by maximum power consumption and other hardware constraints that can reduce the sampling rate (frequency) to below the Nyquist rate (2×50 kHz=100 kHz) required for high-frequency ground fault detection for earth-leakage signals. The randomly jittered sampling module 120 can compensate for the limitations imposed on the maximum sampling rate performed by using randomly jittered under-sampling with the ADC 106, as will be explained further herein. The samples of the signals obtained using the randomly jittered under-sampling techniques disclosed herein may then be processed by the controller 110 for load recognition and disaggregation and waveform amplitude detection in a manner known to those skilled in the art.

In some embodiments, the controller 110 also transmits the samples of the signals obtained using the disclosed randomly jittered under-sampling techniques, and the analysis of the samples performed by the controller 110, to an external monitoring system, such as a cloud-based monitoring system, via the wired/wireless interface 118.

Figure 2:
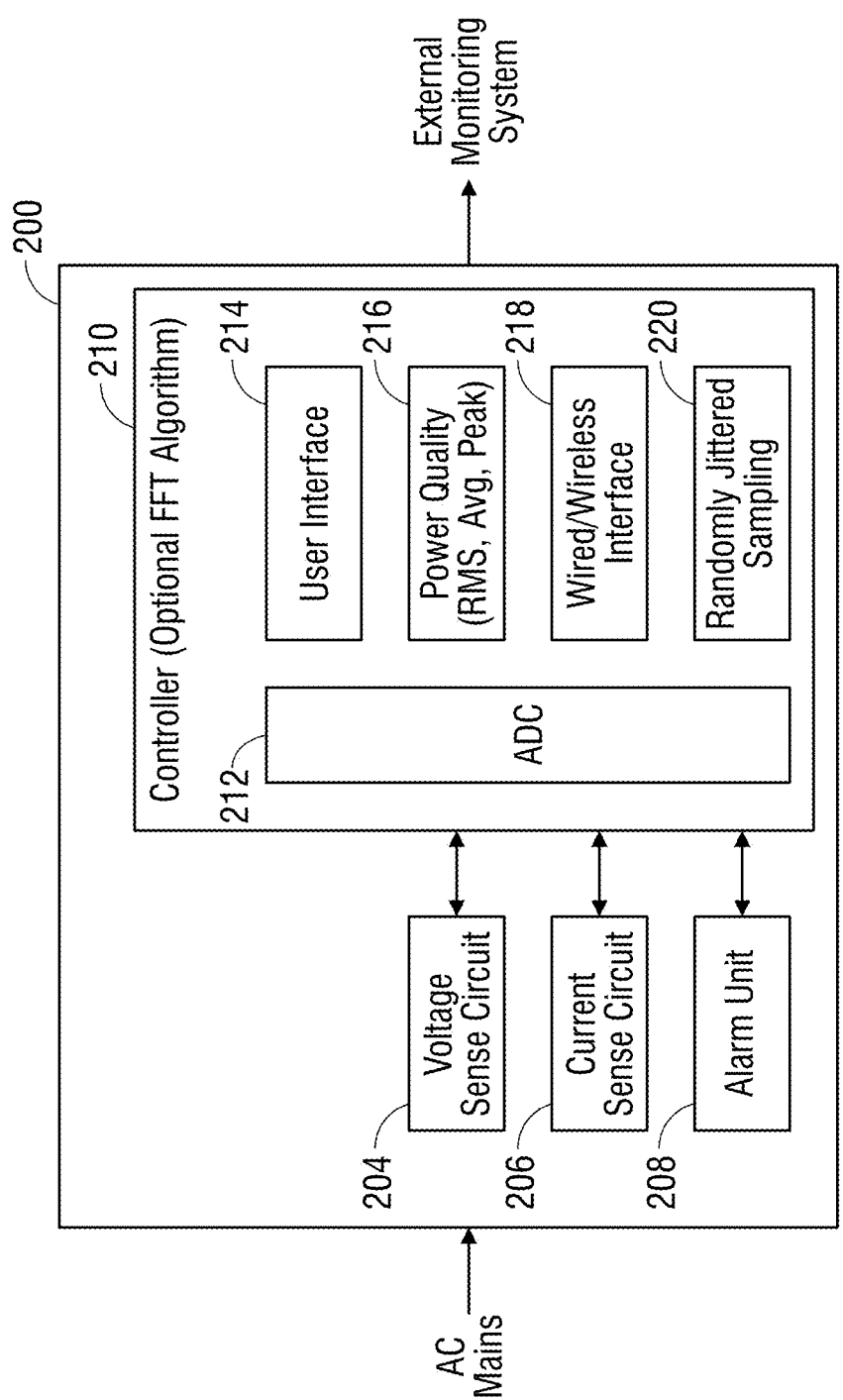
FIG. 2 is a block diagram illustrating an exemplary power meter that can perform randomly jittered under-sampling according to embodiments of the present disclosure.
Figure 3A:
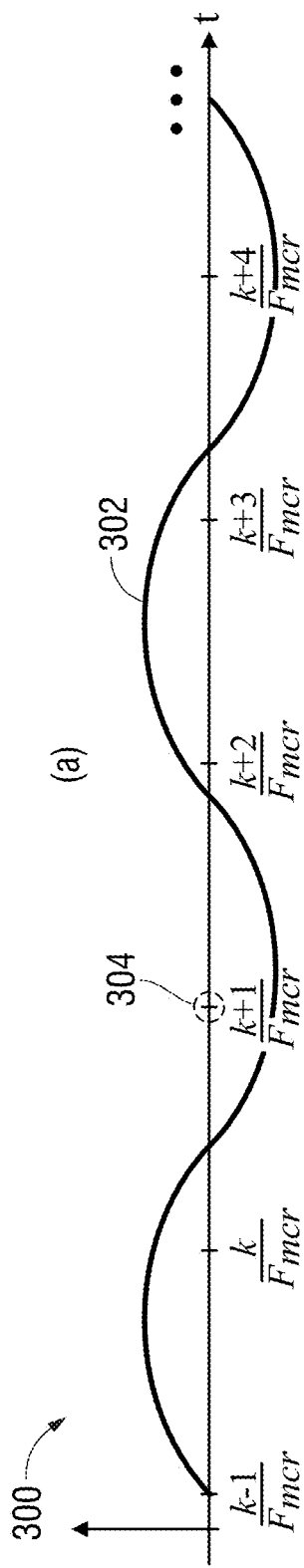
FIGS. 3A-3E are waveform graphs illustrating an exemplary randomly jittered undersampling technique according to embodiments of the present disclosure.
Figure 3B:
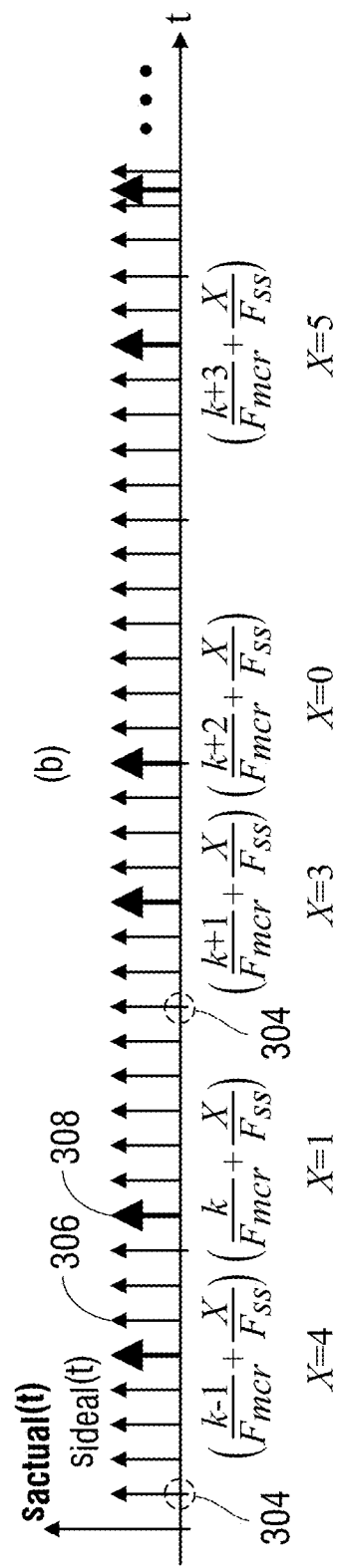
Figure 3C:
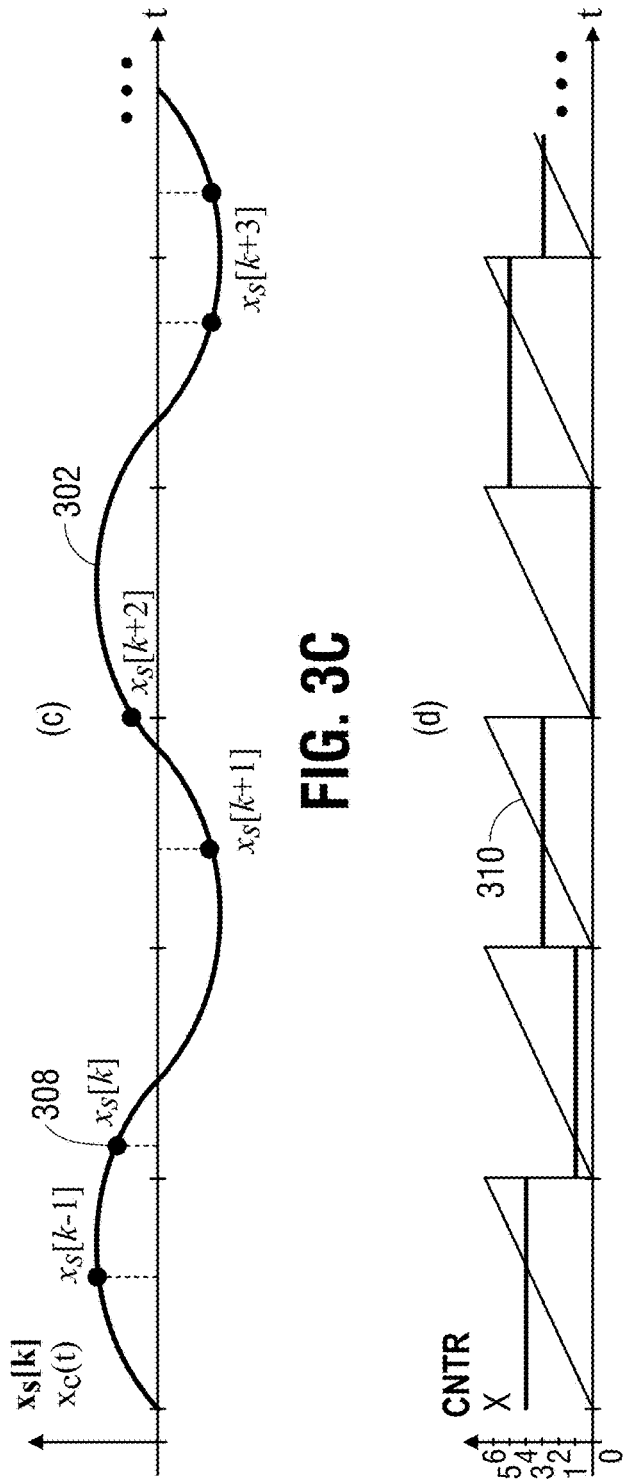
Figure 3D:
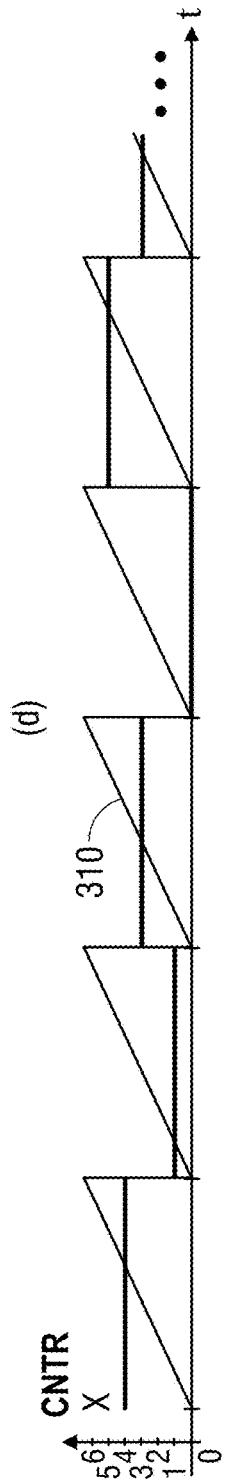
Figure 3E:
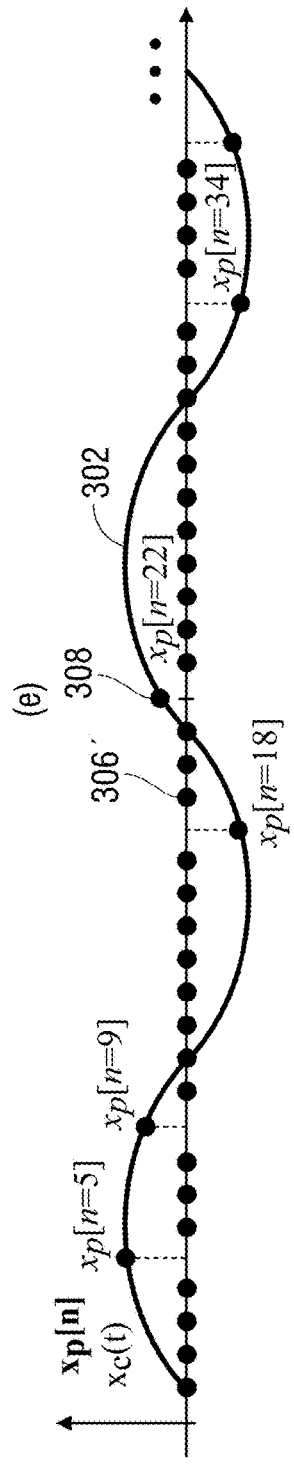

FIG. 2 is a block diagram of an alternative embodiment showing implementation of the randomly jittered under-sampling techniques in a power meter 200. The power meter 200, like the breaker 100, includes a number of functional components or modules, some of which are represented here by individual blocks. These components include, among other things, a voltage sense signal 204 and a current sense circuit 206 in communication with a controller 210. The controller 210 itself can be similar to the controller 110 in the breaker 100 from FIG. 1 insofar as it includes at least one ADC 212 and preferably is capable of executing an FFT algorithm. As before, it is also possible for the ADC 212 to be a separate component from the controller 210 in some embodiments. The controller 210 also includes a user interface module 214, a power quality module 216, and a wire and/or wireless interface module 218. Other functional components and modules not expressly shown may also be included within the scope of the present disclosure. Likewise, one or more of the expressly shown functional components and modules may be removed without departing from the disclosure.

Operation of the power meter 200 is generally well known in the art and therefore only a brief description is provided below. In general, the controller 210 receives analog signals from the voltage sense signal 204 and the current sense circuit 206, and other circuits that can sense AC mains current and voltage. These analog signals are sampled by the ADC 212 at a certain sampling rate that is sufficiently high for waveform amplitude detection. The ADC 212 converts each sample into a numerical value that is proportional to an amplitude of the sample and outputs these values as a time data sequence. The data sequence is then processed in a known manner by the controller 210 to determine average power, peak power, RMS power, and power quality in a manner known to those skilled in the art. If the power quality or other measures of current and/or voltage quality fall outside predefined thresholds, then the controller issues an alert signal to an alarm unit 208 to raise an alarm (e.g., sound an audio alarm, flash a visual alarm, send an alert message, etc.).

In accordance with one or more embodiments, a randomly jittered sampling module 220 may also be provided in the controller 210 for controlling the sampling that the ADC 212 performs on one or more signals in a manner similar to the randomly jittered sampling module 120 in the breaker 100 of FIG. 1. In some embodiments, the controller 210 then transmits the samples of the signals obtained using the disclosed randomly jittered under-sampling techniques, and the analysis of the samples performed by the controller 210, to an external monitoring system, such as a cloud-based monitoring system, via the wired/wireless interface 218. Following is a more detailed discussion of the randomly jittered under-sampling techniques implemented by the randomly jittered sampling modules 120, 220.

In devices like the breaker 100, the power meter 200, and similar devices, the controller is required to detect when the magnitude of a signal exceeds a certain threshold, $V_{th}$, within a given time interval, $T_W$. Detection requires that signal be sampled in a sufficient manner to allow the magnitude of the signal to be accurately reproduced for the controller. For a given signal having a frequency between $[F_L, F_H]$, periodic sampling theory requires a sampling rate that is at least twice $F_H$ (i.e., the Nyquist rate), while standard engineering practice often requires a sampling rate that is at least five times the Nyquist rate to achieve accurate representation of the shape of the signal. However, power and CPU utilization requirements can constrain the sampling rate, $F_{Smpi}$, such that $F_{Smpi} < F_H$, which violates both standard sampling practice and theory for periodic sampling. Even if at any given time the signal is assumed to have a very narrow band in which aliasing could potentially be avoided due to sparsity in the frequency domain, any sample rate chosen below the Nyquist rate risks sampling at exactly the same phase of the signal for any signal that has a frequency $f_{signal} = N/2F_{Smpi}$, where N is a positive integer.

The randomly jittered under-sampling techniques herein allow devices like the breaker 100 and the power meter 200 (and similar devices) to achieve a sufficiently accurate representation of the signal waveform for purposes of the analysis performed by these devices. In addition, no analog signal conditioning components would be needed, although a standard anti-aliasing filter may still be required for the ADC. The randomly jittered under-sampling techniques herein allow all necessary signal processing of samples in the time domain as well as digital filtering and signal processing of an FFT in the frequency domain, while allowing the controller to operate within the power and CPU utilization constraints of the devices. This can save cost and PCBA footprint real-estate by omitting components such as a rectifier/accumulator, which requires diodes and capacitors, while allowing the average sampled data rate to be well within the passband and well below the Nyquist rate of the signal.

Although performing an FFT increases CPU utilization, the FFT provides the advantages of (1) data compression, (2) low data-rate from the ADC, (3) lower BOM cost, (4) smaller footprint, and (5) software defined and updateable frequency response in sensitivity. These advantages may outweigh the cost of increased CPU utilization in many applications. In fact, the constraint on the mean data rate or mean conversion rate is independent of the overall bandwidth of the signal, and is only dependent upon the maximum rate of change of the energy spectral density (ESD) of the frequency bands of the signal that the application is required to detect. By definition, the minimum rise and fall times of the time-dependent ESD will be within the bandwidth of the signal; however, the specification of a particular application might only require detection of changes in the ESD that are well below the upper band of the signal. This latter scenario is particularly well suited for the randomly jittered under-sampling techniques herein.

FIGS. 3A-3E show several waveform graphs, generally indicated at 300, that illustrate an exemplary implementation of the randomly jittered under-sampling techniques herein, as embodied by the controller 110, 210 (e.g., via the randomly jittered sampling modules 120, 220). In the figure, graph (a) depicts a waveform 302 along a time axis, t, for a continuous-time (analog) signal to be sampled, $x_c(t)$, while $F_{mcr}$ denotes a nominal or mean conversion rate (average sampling rate) for the signal, such that one sampling is expected to occur within every $1/F_{mcr}$ second interval, as indicated by the tick marks 304. Advantageously, this nominal sampling rate, $F_{mcr}$, can be predefined or set significantly lower than the Nyquist sampling rate by virtue of the under-sampling techniques disclosed herein.

Graph (b) depicts an ideal sample pulse train for the present example sampling application, $S_{ideal}(t)$, indicated by gray up-arrows, that is obtained according to an ideal sampling rate, $F_{SS}$. This ideal sampling rate, $F_{SS}$, is an integer multiple of the nominal sampling rate, $F_{mcr}$, and is preferably at least equal to the Nyquist sampling rate or higher. Also depicted in graph (b) is an actual sample pulse train, $S_{actual}(t)$, indicated by black up-arrows, that is obtained according to the under-sampling techniques herein. As can be seen, the samples that are actually obtained, $S_{actual}(t)$, are a small, randomly-selected subset of the ideal or imaginary sample pulse train, $S_{ideal}(t)$. In the present example, each of the samples 308 in the actual sample pulse train, $S_{actual}(t)$, is obtained typically coincident with one of the ideal samples 306, but at a randomly-selected forward offset, X, from the tick marks 304 where sampling would normally occur (note, however, that the offset X for the last sample in the graphs falls in between adjacent ideal samples 306).

Thus, in the example of graph (b), at $$\frac{k-1}{F_{mcr}},$$

an actual sample 308 is obtained at $$\left(\frac{k-1}{F_{mcr}} + \frac{X}{F_{ss}}\right)$$

where X=4; at $$\frac{k}{F_{mcr}},$$

an actual sample 308 is obtained at $$\left(\frac{k}{F_{mcr}} + \frac{X}{F_{ss}}\right)$$

where X=1; at $$\frac{k+1}{F_{mcr}},$$

an actual sample 308 is obtained at $$\left(\frac{k+1}{F_{mcr}} + \frac{X}{F_{ss}}\right)$$

where X=3; at $$\frac{k+2}{F_{mcr}},$$

an actual sample 308 is obtained at $$\left(\frac{k+2}{F_{mcr}} + \frac{X}{F_{ss}}\right)$$

where X=0; and at $$\frac{k+3}{F_{mcr}},$$

an actual sample 308 is obtained at $$\left(\frac{k+3}{F_{mcr}} + \frac{X}{F_{ss}}\right)$$

where X=5. Each of these actual samples 308 is obtained typically coincident with one of the ideal samples 306. In general, the sequence of ideal samples can be mathematically described by Equation (1) below, and the sequence of actual samples can be mathematically described by Equation (2) below:

$$s_{ideal}(t) = \sum\nolimits_{\forall n \in \mathbb{Z}} \delta\left(t - \frac{n}{F_{ss}}\right) \quad (1)$$

$$s_{actual}(t) = \sum\nolimits_{\forall k \in \mathbb{Z}} \delta\left(t - \frac{k}{F_{mcr}} - \frac{X}{F_{ss}}\right), \quad (2)$$

$$\text{where } X \sim Uniform(0, \ldots, N-1), N = \frac{F_{ss}}{F_{mcr}}$$

Graph (c) depicts the waveform 302 for the continuous-time signal from graph (a) with the actual samples 308 indicated on the waveform 302, as obtained according to the techniques herein. As can be seen, the number of actual samples 308 obtained is significantly smaller than the number of ideal or imaginary samples 306. In addition, the interval between consecutive actual samples 308 is no longer regular and periodic, but is irregular and aperiodic relative to the nominal sampling interval, hence the term "jittered." In addition, the amount of irregularity and aperiodicity of the actual samples 308 is random/pseudo-random, hence the term "randomly jittered." Each actual sample 308 is preferably coincident with one of the ideal samples 306, although it is possible for the forward offset, X, and hence the actual sample 308, to fall in between adjacent ideal samples 306 within the scope of the present disclosure. In graph (c), the sequence of actual samples may be described by Equation (3) below:

$$x_s[k] = x_c(t_k), \quad (3)$$

$$\text{where } t_k = \frac{k}{F_{mcr}} - \frac{X}{F_{ss}} \text{ and}$$

$$X \sim \text{Uniform}(0, \ldots, N-1), N = \frac{F_{ss}}{F_{mcr}}$$

Graph (d) depicts an exemplary method of issuing a trigger input to an ADC (e.g., ADC 112, 212) to cause the ADC to obtain the actual samples 308 according to the under-sampling techniques herein. In graph (d), the sawtooth waveform 310 designated as CNTR represents the values of a counter. The counter begins counting from a predefined reset value (e.g., zero) at the start of each nominal sampling interval (e.g., tick marks 304). When the counter value reaches a compare value, which in this case is the randomly/pseudo-randomly generated forward offset, X (i.e., when X intersects CNTR), a trigger input is provided to the ADC to cause the ADC to obtain a signal sample.

Note that the values of the actual samples 308 in the actual sample pulse train, $S_{actual}(t)$, are sufficient to estimate peak, mean, RMS (root mean square) values and other statistical analysis for the signal being sampled, in the event a device requires such statistical analysis. Techniques for estimating the RMS value, for example, from the values of the actual samples 308 by deriving a standard deviation for those values are well known to those skilled in the art. In the breaker 100, for example, the RMS, peak, average, mean, and other statistical analysis may be performed by the ground fault detection module 114 and the arc fault detection module 116, whereas in the power meter 200, the statistical analysis may be performed by the power quality module 216.

On the other hand, if a device (e.g., device 100, 200) requires the magnitude of each frequency component of the signal over a long period of time, then in some embodiments, zeroes may be used for the values of each sample 306 in the ideal sample pulse train, $S_{ideal}(t)$, for which an actual sample 308 was not obtained. The zero-padded samples are labeled 306' in graph (e). An FFT may then be performed for the signal using the zero-padded ideal samples 306' and the actual samples 308 to obtain an estimate of the magnitude of each frequency component in the signal (provided $F_{SS}$ is at least equal to the Nyquist rate).

The randomly jittered under-sampling techniques herein affords several advantages. For example, the nominal or effective sampling rate, $F_{mcr}$, can be chosen well below the frequency-band of interest and is equally effective in the traditionally most challenging cases where a single tone frequency, $F_t = F_{mcr}$, and/or $$F_t = \frac{F_{mcr}}{n},$$

where n is an integer. This low effective sample rate reduces the amount of data required to characterize a signal by a factor of $N = F_{SS}/F_{mcr}$, thus reducing resource expenditure such as CPU utilization, memory utilization, and communication bus bandwidth necessary for processing, storing, and transferring the sample data.

The efficacy of the disclosed under-sampling techniques can be understood from at least two viewpoints. First, from a statistical analysis viewpoint, the time-varying signal can be treated as a random variable if it is sampled randomly instead of with the more common periodic sampling. Here, the time-resolution is defined by $F_{SS}$ and an average sample rate is enforced by while the interval between any two successive sample conversions, $T_{conv}$, is a random/pseudo-random variable taken from a discrete uniform distribution $[1/F_{SS}, 2/F_{SS}, 3/F_{SS}, 2N-1/F_{SS}]$. Thus, as long (i) as the time-resolution is sufficiently small, (ii) the ESD of the signal does not change much over the time window of sampling, and (iii) the time window of sampling is sufficiently large, then the signal's statistical measures of standard deviation, mean, and min/max are equal to those statistical measures for the samples.

Consider an example of a metering device that measures the amplitude of the signal within a determined frequency band as the signal evolves over time. In general, a metering device is interested in changes in signal energy over time steps much larger than the inverse of the upper-frequency of the signal band. Therefore, if a metering device can randomly sample a band-limited periodic signal, then it can treat the randomly sampled signal as a random variable. When randomly sampled, the signal mean is the amplitude of the DC bias and the standard-deviation is the RMS of the AC components of the signal. Note that when calculating standard-deviation or RMS over a defined window of samples, the particular order of the samples in the window is irrelevant. What is relevant in the calculation is that the samples are randomly collected and that the sample size is large enough to characterize the signal with a sufficiently small error for the requirements of the metering device.

Figure 4:
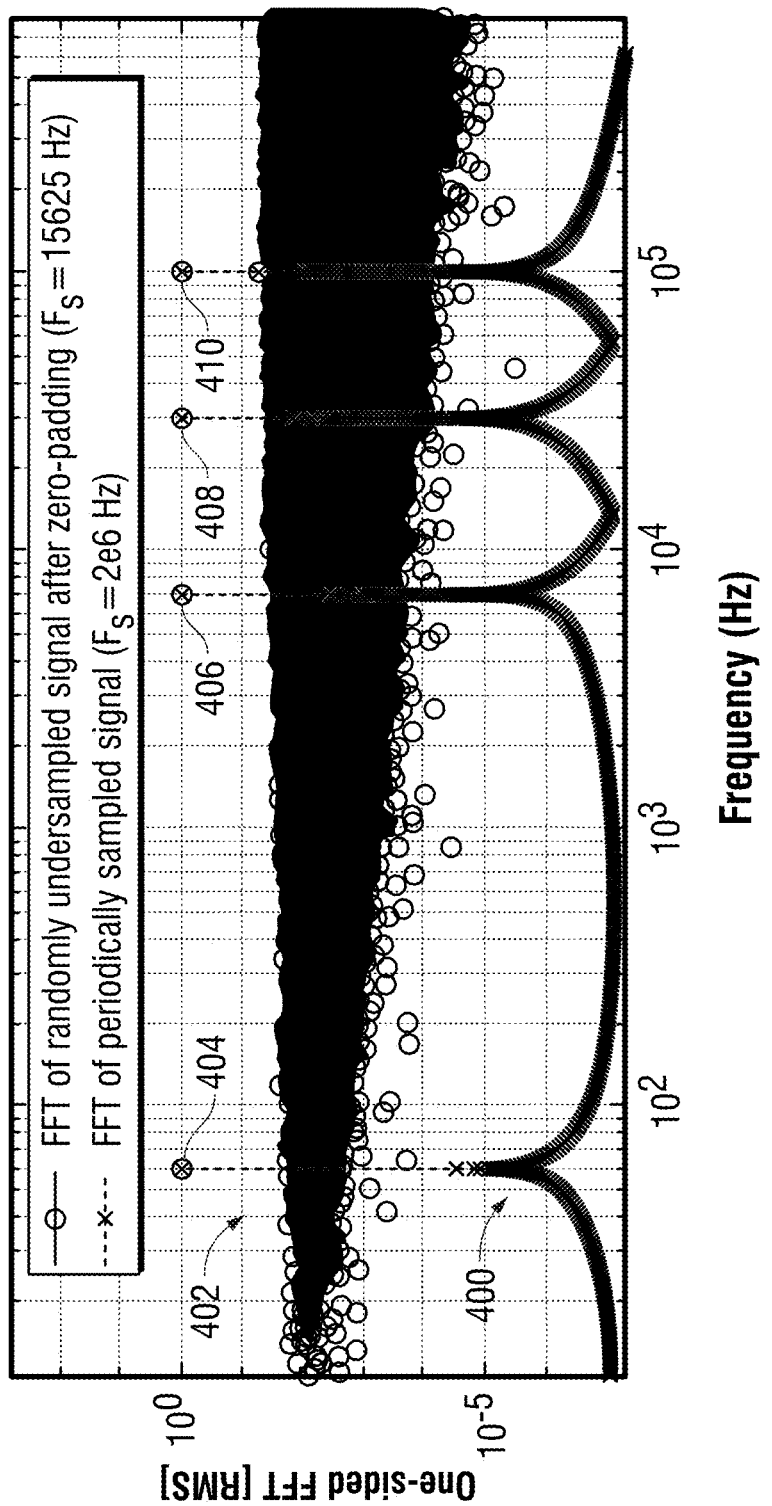
FIG. 4 is a comparison of FFT plots showing an efficacy of the exemplary randomly jittered under-sampling technique according to embodiments of the present disclosure.

FIG. 4 illustrates the efficacy of the disclosed under-sampling techniques from another viewpoint, a Fourier analysis viewpoint. The figure shows a comparison of two FFT plots performed for a mixed-frequency signal, x(t). The first FFT plot 400 is performed using a sequence of samples obtained periodically at a sampling rate of $F_{SS}=2\times10^6$ Hz. The resulting sequence of samples can be described mathematically by Equation (4) below:

$$x(t) = \sum_{i=\{1,2,3,4\}} [\sqrt{2}\sin(2\pi f_i t)], \quad (4)$$

$$\text{where } \begin{cases} f_1 = 60 \\ f_2 = 7e3 \\ f_3 = 30e3 \\ f_4 = 100e3 \end{cases}$$

The second FFT plot 402 is performed using a sequence of samples obtained using the zero-padded randomly jittered under-sampling techniques herein at a nominal or average sampling rate of $F_{mcr}=15{,}625$ Hz, $F_S=2$ MHz, and X~Uniform(0, . . . , 225). The resulting sequence of samples can be described mathematically by Equation (5) below:

$$x_p[n] = \begin{cases} x_s[k], \text{ where } t_n = \frac{n}{F_{ss}} = \frac{k}{F_{mcr}} + \frac{X}{F_{ss}} \\ (\text{i.e., } x_p[n] \text{ occurs in phase with } x_s[k]) \\ 0, \text{ otherwise} \end{cases} \quad (5)$$

As seen in the FFT plots 400, 402, the amplitude of the four principle frequency components, indicated at 404, 406, 408, and 410, are correctly identified by both plots. The only substantive difference between the two FFT plots 400, 402 is that there is additional broad-band noise in the second FFT plot 402 for the zero-padded randomly jittered under-sampled signal, $x_p[n]$, and that the FFT of $x_p[n]$ must be scaled up by a factor of $F_{SS}/F_{mcr}$. The added noise is due to the zero-padding essentially creating a sequence that has a bandwidth much larger than $F_{SS}$, as only such a signal could create the pulses in the time-domain which are evident in the zero-padded sequence. Thus, the noise in the second FFT plot 402 is introduced by aliasing inherent in the zero-padded signal.

In some embodiments, the above aliasing artifact may be avoided by creating $x_p[n]$ as a summation of SINC functions, each scaled by $x_s[k]$ and centered at positions where $x_p[n]=x_s[k]$ to ensure both conservation of energy and that the bandwidth of the underlying sequence is no larger than $F_{SS}/2$. However, for practical purposes, the FFT plot 402 for the zero-padded sequence suggests that random sampling using the randomly jittered under-sampling techniques herein can be functionally equivalent to sampling at an ideal sampling rate, $F_{SS}$ while only requiring conversion and processing of samples at the much lower nominal rate, $F_{mcr}$, with the (minor) additional processing cost resulting from broad-band noise being added to the sampled signal when processing the data in the frequency domain.

Following is an exemplary subroutine, written in Matlab, that may be used to generate the FFT plots shown in FIG. 4.

```
Fs = 2e6;
Fhat = 15625;
t = 1/Fs:1/Fs:5;
if mod (length (t), 2 )==0
    t(end+1) = t(end)+1/Fs;
end
Nsim = length(t);
% x = [sin(2*pi*30e3*t(1:Nsim/2)), zeros(1,Nsim/2)] ...
%                        + [zeros(1,Nsim/2), sin(2*pi*100e3*t (Nsim/2+1:end))] ...
%                        + 0.1*square(2*pi*10*t,50) ...
%                        + 3*sqrt(2)*sin(2*pi*60*t) ...
%                        + [zeros(1,Nsim/4),sin(2*pi*400e3*t(Nsim/4+1:Nsim*3/4)),zeros(1,Nsim/4)];
x = 1*sqrt(2)*sin(2*pi*30e3*t) ...
    + 1*sqrt(2)*sin(2*pi*100e3*t) ...
    + 1*sqrt(2)*sin(2*pi*60*t) ...
    + 1*sqrt(2)*sin(2*pi*7e3*t) ;
[xJ, idxJ, idxU] = JitteredSampling (x,Fs,Fhat,0);
%
L = length(xJ) * Fs/Fhat;      % Length of zero-padded signal
if mod(L,2)==0
    L = L+1;
end
% SampleIdx = obj.GF_RAND_LOG(:) +
cumsum(repmat(256,length(obj.GF_RAND_LOG(:)),1)) − 255;
SampleIdx = idxJ;
xJpad = zeros(1,L);
xJpad(SampleIdx) = xJ;
xJpad(isnan(xJpad)) = 0;
XJpad = fft(xJpad,L,2);
P2 = abs(XJpad/L) * Fs/Fhat;
P1 = P2(1:(L/2+0.5)) + fliplr([P2((L/2+1.5):end),0]);
P1(1:end-1) = P1(1:end-1);
f = Fs*(0:(L/2))/L;
figure;
ax1 = nexttile;
plot(t,xJpad);
hold on;
%                    plot( SampleIdx/4e3, obj.GF_SAMPLES )
hold off;
title('Signal Overlaid with zero-pad reconstruction')
xlabel('t (milliseconds)')
ylabel('X(t) ' )
ax2 = nexttile;
loglog(f,P1/sqrt (2) )
title('FFT of Randomly jittered undersampled signal after zero-padding')
xlabel('f (Hz)')
ylabel ('|P1(f)|/sqrt(2) [RMS]')
X = fft(x,L,2);
PX2 = abs(X/L);
PX1 = PX2(1:L/2+0.5)*2;
figure;
loglog(f,P1/sqrt(2),'-o')
hold on;
loglog(f,PX1/sqrt(2),':x')
xlabel('Frequency (Hz)')
ylabel('One-sided FFT [RMS]')
```

```
title('FFT Demo of randomly jittered undersampled signal after zero-padding')
legend('FFT of randomly undersampled signal after zero-padding (F_s = 15625
Hz)','FFT of periodically sampled signal (F_s = 2e6 Hz)')
function [ x_AtTrigger, idxOfTrigger, idxOfTimerUpdate ] = ...
                JitteredSampling ( x_AtTimerTick, fTimer, fHatTrigger,
minFractionTimeBetweenSamples )
x_AtTrigger = [ ] ;
idxOfTrigger = [ ];
idxOfTimerUpdate = [ ];
meanTicksPerTrigger = round( fTimer/fHatTrigger );
numberOfTimerTicks = size(x_AtTimerTick, 2);
idxOfTimerUpdate = 1:meanTicksPerTrigger:(numberOfTimerTicks-
meanTicksPerTrigger+1) ;
numberOfTriggers = length (idxOfTimerUpdate);
maxOffset = floor((meanTicksPerTrigger-1)*(1-minFractionTimeBetweenSamples));
jitterOffset = randi([0 maxOffset],1,numberOfTriggers);
idxOfTrigger = idxOfTimerUpdate + jitterOffset;
x_AtTrigger = x_AtTimerTick(:,idxOfTrigger);
end
```

It should be noted that the use of an FFT algorithm, while beneficial, is strictly optional in some embodiments. There are multiple applications of the samples collected using the randomly jittered undersampling that do not require an FFT. For example, on the samples alone, statistical analysis as well as digital signal processing in pseudo-time domain may be performed without an FFT. The samples and a record of their corresponding offset values, X, may be simply analyzed statistically, either locally in the device or after transmission to an external digital processing and/or analysis system. The samples may also be reconstructed using zero-padding and digitally signal processed in the time domain. The zero padded reconstructed signal may also be analyzed in the frequency domain using FFT, as discussed above. Digital signal processing may also be performed on the results of the FFT in the frequency domain, either locally in the device or after transmission to an external digital processing and/or analysis system.

Note also that the subsequent analyses do not need to be performed by the same controller that performs the randomly jittered undersampling. Instead, the samples and their corresponding offsets, X, may be stored and then later downloaded or transmitted to another device that performs the analyses post-process, depending on the needs of the particular application. The storage and transmission of such undersampled data still benefit from the reduced data size relative to data collected at the ideal rate, $F_{SS}$.

Figure 5:
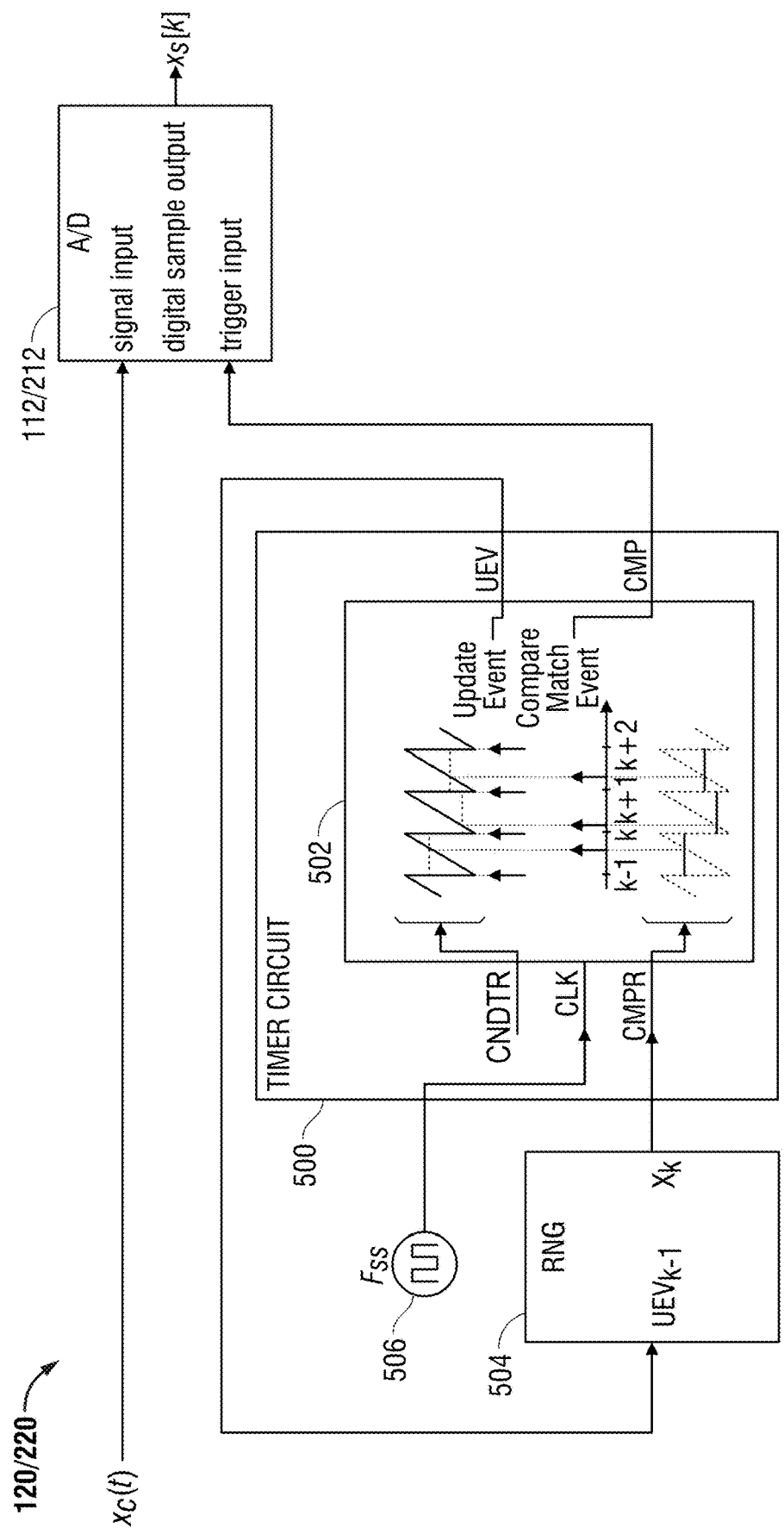
FIG. 5 is a block diagram illustrating an exemplary implementation of a randomly jittered sampling module according to embodiments of the present disclosure.

FIG. 5 illustrates an exemplary implementation of the randomly jittered sampling module 120, 220 discussed above. Recall from the discussion of graph (d) that a timer compare-match scheme may be used to issue the trigger input to an ADC (e.g., ADC 112, 212) to cause the ADC to obtain the actual samples 308 according to the sampling techniques herein. As such, the exemplary implementation of the randomly jittered sampling module 120, 220 shown in FIG. 5 includes a timer circuit 500. The timer circuit 500 may be a software module executed by a controller (e.g., controller 110, 210), or it may be a separate on-board circuit on the printed circuit board assembly (PCBA), or a peripheral component on an MCU. In some embodiments, the timer circuit 500, the ADC 112/212, and the RNG 504 may be peripheral hardware components on an MCU, such as Model No. STM32L412 MCU, available from STMicroelectronics, Inc. Sampling data can then be transferred between those peripherals via DMA channels (also built into the MCU).

In general operation, assertion of a CNDTR (counter) input (e.g., by the controller) causes an internal counter on board the timer 502 to begin incrementing an internal counter value from a predefined reset value (e.g., zero) until the counter reaches a predefined final value $$\left(e.g., \frac{F_{ss}}{F_{mcr}} - 1 = N - 1\right),$$

referred to as "update event" value. The predefined update event value will correspond to a nominal sampling interval, $1/F_{mcr}$ (e.g., tick marks 304), discussed above with respect to graph (a). The counter may increment its counter value at the same rate as an internal clock speed, or a lower rate that is proportional to the internal clock speed. Upon reaching the predefined update event value, the timer 502 restarts the internal counter and asserts an UEV (update event) output.

Assertion of the UEV output causes an on-chip random number generator 504 connected to the UEV output to receive an input, $UEV_{k-1}$, that causes the random number generator 504 to generate a random/pseudo-random value, $X_k$. This random/pseudo-random value is the forward offset, X, discussed above. Note that the random number generator 504 is shown in this example as a separate peripheral component. In some embodiments, the random number generator 504 may alternatively be implemented as a pseudo-random number look-up table stored in a memory of the controller, or it may be a software implementation of a random number generator running in a controller, such as the controller 110, 210. In either case, the forward offset is then provided as an input to a CMPR (compare) input of the timer 502 to be used as a compare value for the internal counter. When the internal counter value matches the compare value (forward offset value), the timer 502 asserts a CMP (compare match) output.

Assertion of the CMP output causes the ADC 112, 212 (via trigger input which is connected to the CMP output) to obtain a sample of the signal in a manner similar to that shown in graph (b) in FIG. 3 at 308. The timing of the CMP output, and hence the timing of the trigger input, changes randomly with the forward offset. The change results in a series of samples that have aperiodic (unevenly spaced) sampling intervals, with the amount of aperiodicity being randomly/pseudo-randomly generated. An on-board or on-chip timer clock 506 may be provided to generate a clock signal for a CLK (clock) input of the timer 502. The clock 506 may generate a clock signal having a frequency that corresponds to the ideal sampling rate, $F_{SS}$ (e.g., larger than or equal to twice the Nyquist rate), or the timer 502 may scale the clock signal from the timer 506 such that the counter counts at a rate that corresponds to the ideal sampling rate, $F_{SS}$.

Figure 6A:
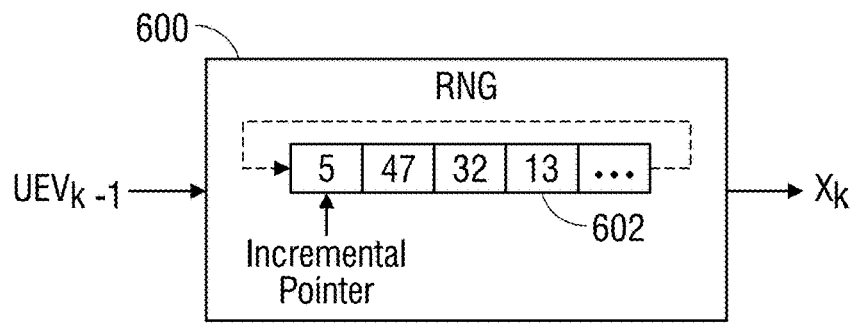
FIGS. 6A-6C are block diagrams illustrating exemplary implementations of random number generators according to embodiments of the present disclosure.
Figure 6B:
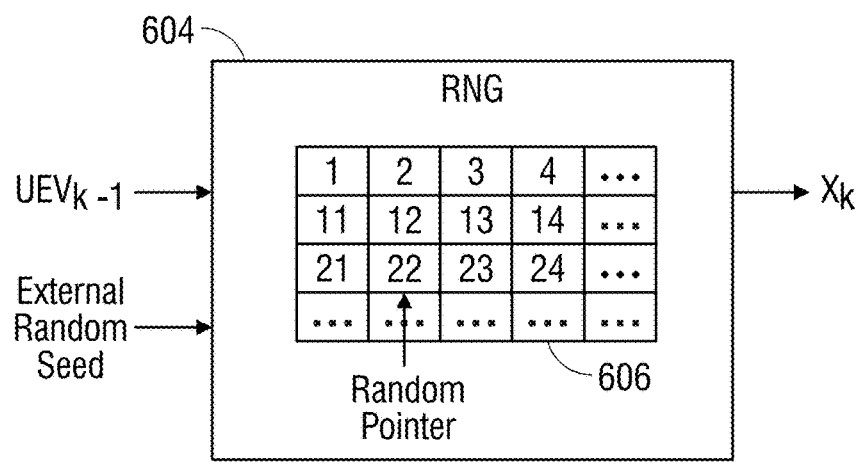
Figure 6C:
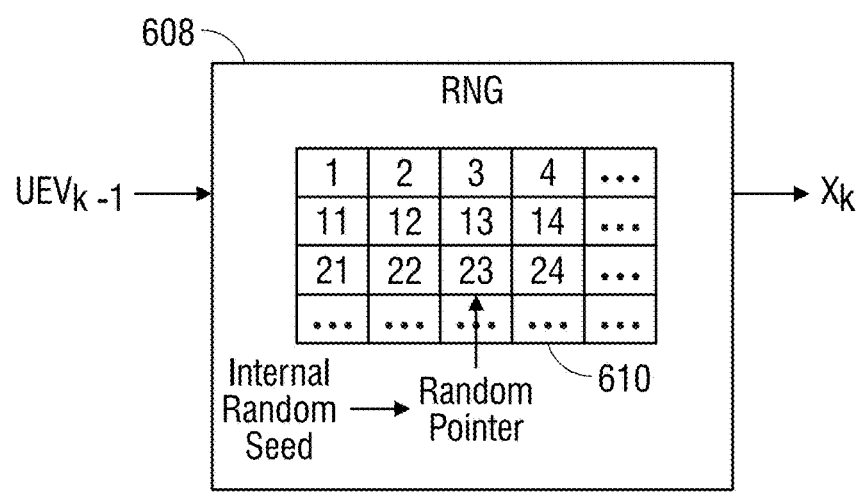

FIGS. 6A-6C illustrate several exemplary implementations of a random number generator that may be used as the random number generator 504 in FIG. 5. As with the random number generator 504, each of the random number generators in FIGS. 6A-6C may be implemented as software that runs within a controller, or as a separate component from the controller, or as a connected hardware peripheral which is built in to the controller and configurable via software running on the controller. In the hardware peripheral case, the random number generator 504 may be implemented using a 16-bit value from a dedicated hardware peripheral random number generator in an STM32L412 MCU. A DMA may be used to cast the 16-bit value to 8-bit value and then transfer it directly to the compare register (CMP) of the timer peripheral. This may be performed by the hardware on the MCU without any operation by the CPU except for the initial configuration of the peripherals including the DMA.

Referring to FIG. 6A, an exemplary random number generator 600 is shown that uses a long, preset string or sequence of numbers 602 that that have been generated or otherwise selected so as to appear random. An pointer may then be advanced incrementally from one number to the next along the sequence 602 to generate a random number. Once the end of the sequence 602 is reached, the pointer may be set back to the start of the sequence to begin again. Such an arrangement may suffice to generate a pseudo-random number provided the sequence 602 is sufficiently long.

FIG. 6B illustrates an exemplary random number generator 604 that uses an array of numbers 606. A pointer may then be used to randomly select one of the numbers in the array of numbers 606. The pointer in this example may be indexed by the random number generator 606 using an external random seed. Any external physical phenomenon or event that is random in nature may be used as the external random seed, such as the frequency of ambient noise at a given instant, and the like. The array of numbers 606 is shown in this example as being sequential, but a sequential array is not required, nor does the array need to follow any particular pattern, provided the pointer is randomly indexed.

FIG. 6C illustrates an exemplary random number generator 608 that also uses an array of numbers 610. A pointer may again be used to randomly select one of the numbers in the array of numbers 610. However, the pointer in this example is indexed by the random number generator 608 using an internal random seed. Any internal physical phenomenon or event that is suitably random may be used as the internal random seed, such as the thermal noise of a resistor or other circuit component, and the like. The array of numbers 610 is also shown in this example as being sequential, but a sequential array is not required, nor does the array need to follow any particular pattern, provided the pointer is indexed randomly.

Those having ordinary skill in the art understand that there are other techniques for implementing a random number generator entirely in software without requiring any internal or external seed.

The foregoing embodiments provide numerous advantages and benefits. Among other benefits, digital signal processing may be performed on a signal using a much reduced average sampling rate, resulting in greater efficiency compared to conventional/traditional periodic sampling. In addition, the signal processing may be performed digitally, which provides significantly more options compared to processing of analog signals.

As well, most analog filtering components (with the possible exception of the anti-aliasing filter) may be replaced by combining the randomly jittered under-sampling techniques herein with digital filtering techniques to digitize the signal chains for arc fault detection, ground fault detection, load recognition, load disaggregation, and metering in residential breakers with little or no additional controller requirements. For example, the RSSI (Received Signal Strength Indicator) circuit typically used in many arc fault detection applications may be replaced with a firmware implementation that combines the randomly jittered under-sampling techniques herein with digital signal processing to obtain the RSSI output signal (with minimal remaining analog components). Similarly, the op-amp and/or feedback filter in various discrete components typically found in many GFCI applications may be removed and replaced with a firmware implementation that combine the randomly jittered under-sampling techniques herein with digital signal processing.

Faster time-to-manufacture may be achieved by virtue of the ability to simply reprogram or re-flash the controllers (i.e., firmware modification) for any revisions that may be needed in the signal-chain frequency response characteristics. This can result in, among other benefits, fewer analog components and thus lower BoM (bill of materials) cost and smaller PCB footprint, reduced auto-monitoring/diagnostic requirements and reduced testing time. Further, development of new algorithms over multiple frequency bands can be accomplished without requiring hardware modifications. Log data may be stored in a database of such log data and continually re-used for future development. Such log data will inherently contain wider frequency spectrum, which can help to significantly improve future load disaggregation, load recognition, and metering applications.

Thus far, specific embodiments of the randomly jittered under-sampling techniques herein have been shown and described. Following now in FIG. 7 is a general method that may be used to implement these various embodiments.

Figure 7:
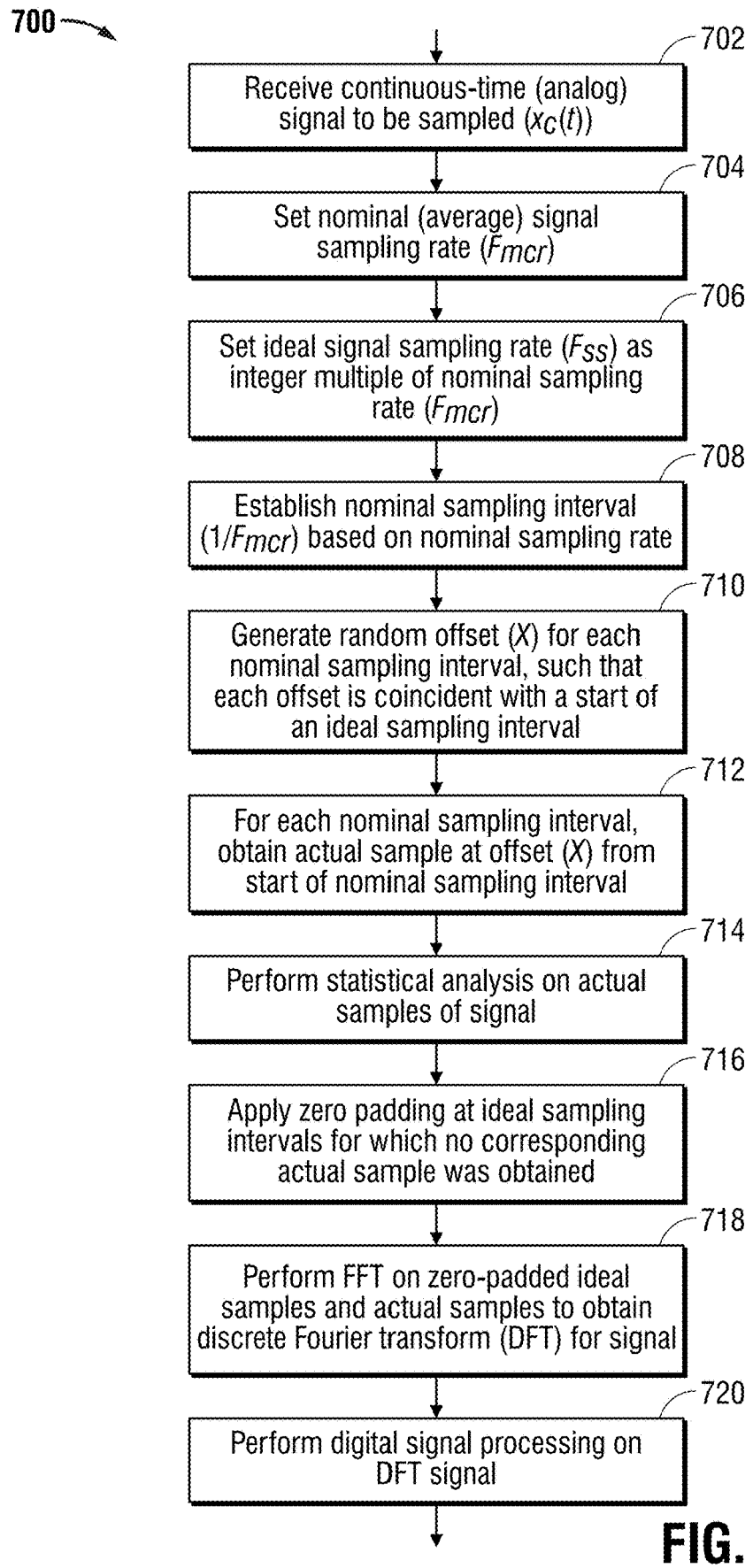
FIG. 7 is a flow diagram illustrating an exemplary method of implementing randomly jittered under-sampling according to embodiments of the present disclosure.

Referring to FIG. 7, a flowchart 700 is shown for a method of implementing randomly jittered under-sampling in a current/voltage signal analysis device according to various embodiments of the present disclosure. The current/voltage signal analysis device may be a circuit breaker (e.g., circuit breaker 100), a power meter (e.g., power meter 200), or any other device that requires sampling and processing of a time-continuous (analog) signal, such as an AC mains current and/or voltage signal.

The method generally begins at 702 where a continuous-time signal to be sampled, $x_c(t)$, is received at the device. At 704, a nominal or average signal sampling rate, $F_{mcr}$, is set for the device, for example, by recalling the nominal sampling rate from a location in a memory of a controller for the device. At 706, an ideal or imaginary signal sampling rate, $F_{SS}$, is set for the device, for example, by recalling the ideal sampling rate from a location in a memory of a controller for the device. As discussed above, the ideal sampling rate, $F_{SS}$, is an integer multiple of the nominal sampling rate, $F_{mcr}$, and is preferably at least equal to twice the Nyquist sampling rate or higher.

At 708, a nominal sampling interval, $$\frac{1}{F_{mcr}} = \frac{N}{F_{ss}},$$

is established for the device based on the nominal sampling rate. The nominal sampling interval may be computed on an as-needed basis by the controller for the device, or it may be recalled from a memory location of the controller for the device. At 710, an offset, X, may be randomly/pseudo-randomly generated for each nominal sampling interval by a randomly jittered sampling module (e.g., randomly jittered sampling module 120, 220). The offset is generated such that each offset is typically coincident with the start of an ideal sampling interval. These offsets are typically forward offsets (i.e., forward from the start of a nominal sampling interval), but other offset arrangements may be used within the scope of the present disclosure. The result is a sequence of actual samples that have irregular or aperiodic sampling intervals where the degree of irregularity or aperiodicity is randomly/pseudo-randomly generated.

At 712, for each nominal sampling interval, an actual sample is obtained by an ADC (e.g., ADC 112, 212) at the randomly/pseudo-randomly generated offset, X, from the start of the nominal sampling interval. The randomly/pseudo-randomly generated offset is such that the ADC obtains the actual sample typically coincident with, but may be out of sync from, the start of an ideal sampling interval. The amount of the off-sync may differ from one sample to the next, depending on the particular application. At 714, statistical analysis and other signal processing is performed on the sequence of actual samples for the signal to extract information from the signal, such as an RMS value, a peak value, a mean value, an average value, and the like.

At 716, optionally, zero padding is applied to each ideal sampling interval for which no actual sample was obtained (i.e., a sample value of zero is used at each such ideal sampling interval). At 718, an FFT is performed on the zero-padded ideal samples and the actual samples to obtain an estimate of the amplitude of the frequency components to obtain a discrete Fourier transform (DFT) for the signal. At 720, further signal processing may be performed on the DFT of the signal as needed, such as an estimate of the amplitude of the frequency components thereof.

Figure 8:
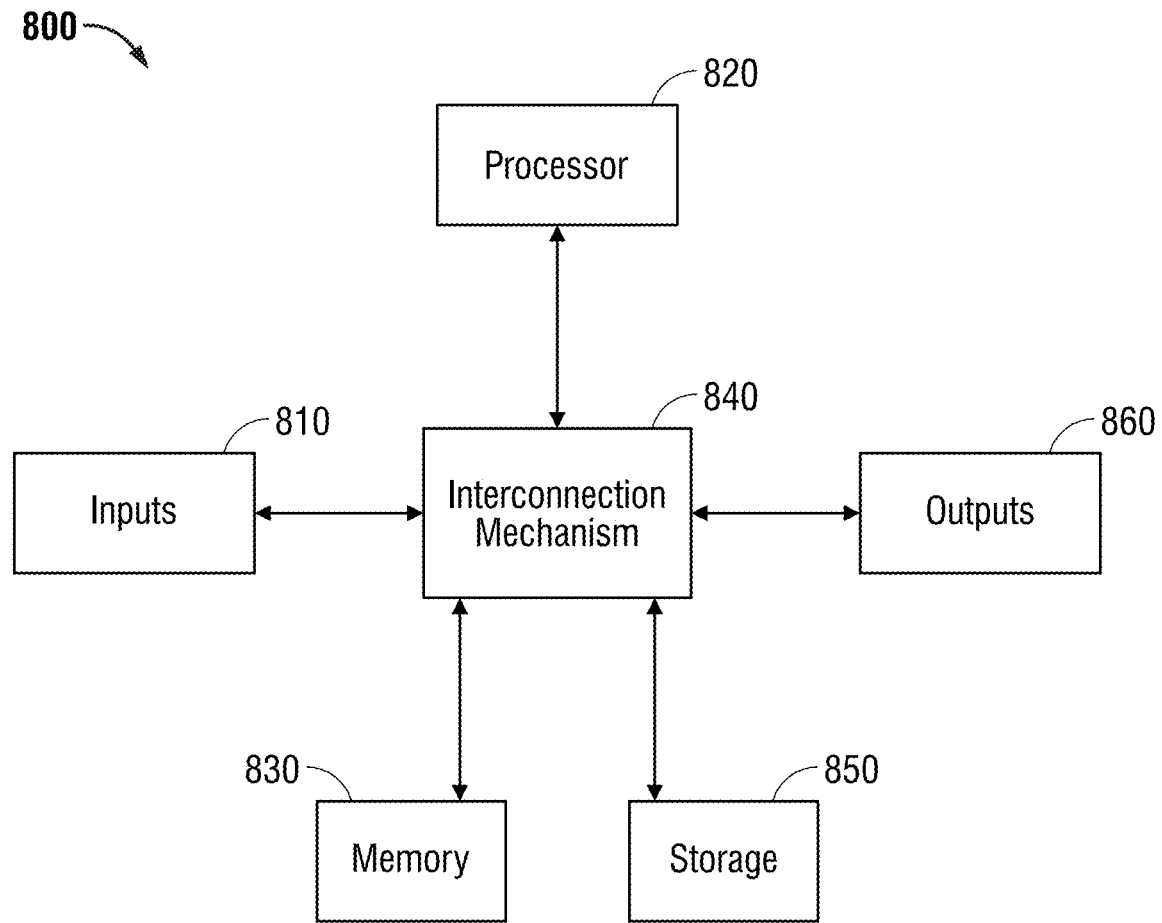
FIG. 8 is a functional block diagram of a general-purpose controller that may be used to implement various embodiments of this disclosure.

FIG. 8 illustrates an exemplary controller that may be used to implement various embodiments of this disclosure. In general, any general-purpose controller may be used in various embodiments of this disclosure. For example, various embodiments of the disclosure may be implemented as specialized software executing in a controller 800 such as that shown in FIG. 8. The controller 800 may include a processor 820 connected to one or more memory devices 830. Memory 830 is typically used for storing programs and data during operation of the controller 800. The controller 800 may also include a storage system 850 that provides additional storage capacity. Components of controller 800 may be coupled by an interconnection mechanism 840, which may include one or more busses. The interconnection mechanism 840 enables communications (e.g., data, instructions) to be exchanged between components of controller 800.

Controller 800 also includes one or more inputs 810 (e.g., for receiving data, instructions) and one or more outputs 860 (e.g., for providing data, instructions). In addition, controller 800 may contain one or more interfaces (not shown) that connect controller 800 to a communication network (in addition or as an alternative to the interconnection mechanism 840).

The controller 800 may include specially programmed, special-purpose hardware, for example, an application-specific integrated circuit (ASIC). Aspects of the disclosure may be implemented in software, hardware or firmware, or any combination thereof. Further, such methods, acts, systems, system elements and components thereof may be implemented as part of the controller described above or as an independent component.

Although controller 800 is shown by way of example as one type of controller upon which various aspects of the disclosure may be practiced, it should be appreciated that aspects of the disclosure are not limited to being implemented on the controller as shown in FIG. 8. Controller 800 may be a general-purpose controller that is programmable using a high-level programming language. Controller 800 may be also implemented using specially programmed, special purpose hardware. In controller 800, processor 820 is typically a commercially available processor such as the STM32L412 MCU discussed above from STMicroelectronics, Inc.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. Program code embodied on a computer-readable medium may be transmitted using any appropriate medium, including but not limited to wireless, wireline, optical fiber cable, RF, etc., or any suitable combination of the foregoing. Program code for carrying out operations for aspects of the present disclosure may be written in any combination of one or more programming languages.

While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by programming logic (e.g., program instructions, hardware logic, a combination of the two, etc.). Moreover, the execution of such program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

I claim:

1. A system for analyzing a current or voltage signal, comprising:
   a controller;
   an analog-to-digital converter (ADC) coupled to the controller;
   a sense circuit coupled to the ADC and configured to provide the current or voltage signal to the ADC from an AC mains;
   a randomly jittered sampling module coupled to the ADC and operable to provide a trigger input to the ADC, the trigger input causing the ADC to acquire a sample of the current or voltage signal provided by the sense circuit;
   wherein the randomly jittered sampling module is further operable to cause the ADC to acquire an aperiodic sequence of samples of the current or voltage signal, the aperiodic sequence of samples having an amount of aperiodicity that is randomly generated, and the controller is operable to perform signal processing on the aperiodic sequence of samples to extract information from the signal and provide the information to an external system.

2. The system according to claim 1, wherein the randomly jittered sampling module causes the ADC to acquire the aperiodic sequence of samples using a nominal sampling rate and an ideal sampling rate, the ideal sampling rate being an integer multiple of the nominal sampling rate.

3. The system according to claim 2, wherein the nominal sampling rate has a corresponding nominal sampling interval and the ideal sampling rate as a corresponding ideal sampling interval, the randomly jittered sampling module further operable to generate a random offset for each nominal sampling interval, such that each random offset is coincident with a start of an ideal sampling interval.

4. The system according to claim 3, wherein the controller is further operable to perform a statistical analysis on the aperiodic sequence of samples, the statistical analysis including determining a root-mean-square (RMS) value for the aperiodic sequence of samples.

5. The system according to claim 3, wherein the controller is further operable to apply a zero value at each ideal sampling interval where no sample of the current or voltage signal was acquired to obtain a zero-padded sequence of samples, and perform a fast Fourier transform using the zero-padded sequence of samples and the aperiodic sequence of samples to obtain an amplitude of a frequency component of the current or voltage signal.

6. The system according to claim 2, wherein the ideal sampling rate is at least two times higher than a highest frequency component of the current or voltage signal.

7. The system according to claim 1, wherein the system is one of: a circuit breaker, or a power meter.

8. The system according to claim 1, wherein the aperiodic sequence of samples has fewer than an ideal number of samples for the current or voltage signal.

9. A method of analyzing a current or voltage signal, comprising:
   providing, at a sense circuit, a current or voltage signal from an AC mains to an analog-to-digital converter (ADC);
   providing, at a randomly jittered sampling module coupled to the ADC, a trigger input to the ADC, the trigger input causing the ADC to acquire a sample of the current or voltage signal provided by the sense circuit; and
   changing, at the randomly jittered sampling module, a timing of the trigger input to cause the ADC to acquire an aperiodic sequence of samples of the current or voltage signal, the aperiodic sequence of samples having an amount of aperiodicity that is randomly generated and fewer than an ideal number of samples for the current or voltage signal; and
   performing, at a controller coupled to the ADC, signal processing on the aperiodic sequence of samples to extract information from the signal and providing the information to an external system.

10. The method according to claim 9, further comprising using, at the randomly jittered sampling module, a nominal sampling rate and an ideal sampling rate, the ideal sampling rate being an integer multiple of the nominal sampling rate, to cause the ADC to acquire the aperiodic sequence of samples.

11. The method according to claim 10, wherein the nominal sampling rate has a corresponding nominal sampling interval and the ideal sampling rate as a corresponding ideal sampling interval, further comprising generating, at the randomly jittered sampling module, a random offset for each nominal sampling interval, such that each random offset is coincident with a start of an ideal sampling interval.

12. The method according to claim 11, further comprising performing, at the controller, a statistical analysis on the aperiodic sequence of samples, the statistical analysis including determining a root-mean-square (RMS) value for the aperiodic sequence of samples.

13. The method according to claim 12, further comprising applying, at the controller, a zero value at each ideal sampling interval where no sample of the current or voltage signal was acquired to obtain a zero-padded sequence of samples, and performing a fast Fourier transform using the zero-padded sequence of samples and the aperiodic sequence of samples to obtain an amplitude of a frequency component of the current or voltage signal.

14. The method according to claim 10, wherein the ideal sampling rate is at least two times higher than a highest frequency component of the current or voltage signal.

15. The method according to claim 9, wherein the controller, sense circuit, ADC, and randomly jittered sampling module form part of: a circuit breaker, or a power meter.

16. A non-transitory computer-readable medium having computer-readable instructions stored thereon for analyzing a current or voltage signal, the computer-readable instructions, when executed by a controller, cause the controller to perform a process that:
receives a current or voltage signal from an AC mains at an analog-to-digital converter (ADC);
provides a trigger input to the ADC, the trigger input causing the ADC to acquire a sample of the current or voltage signal provided by the sense circuit; and
changes a timing of the trigger input to cause the ADC to acquire an aperiodic sequence of samples of the current or voltage signal, the aperiodic sequence of samples having an amount of aperiodicity that is randomly generated; and
performs signal processing on the aperiodic sequence of samples to extract information from the signal and provides the information to an external system.

17. The non-transitory computer-readable medium according to claim 16, wherein the computer-readable instructions further cause the controller to perform a process that uses a nominal sampling rate and an ideal sampling rate, the ideal sampling rate being an integer multiple of the nominal sampling rate, to cause the ADC to acquire the aperiodic sequence of samples.

18. The non-transitory computer-readable medium according to claim 17, wherein the nominal sampling rate has a corresponding nominal sampling interval and the ideal sampling rate as a corresponding ideal sampling interval, the computer-readable instructions further causing the controller to perform a process that generates a random offset for each nominal sampling interval, such that each random offset is coincident with a start of an ideal sampling interval.

19. The non-transitory computer-readable medium according to claim 18, wherein the computer-readable instructions further cause the controller to perform a process that performs a statistical analysis on the aperiodic sequence of samples, the statistical analysis including determining a root-mean-square (RMS) value for the aperiodic sequence of samples.

20. The non-transitory computer-readable medium according to claim 19, wherein the computer-readable instructions further cause the controller to perform a process that applies a zero value at each ideal sampling interval where no sample of the current or voltage signal was acquired to obtain a zero-padded sequence of samples and performs a fast Fourier transform using the zero-padded sequence of samples and the aperiodic sequence of samples to obtain an amplitude of a frequency component of the current or voltage signal.

21. The non-transitory computer-readable medium according to claim 17, wherein the ideal sampling rate is at least two times higher than a highest frequency component of the current or voltage signal.

22. The non-transitory computer-readable medium according to claim 16, wherein the aperiodic sequence of samples has fewer than an ideal number of samples for the current or voltage signal.

* * * * *